United States Patent

Jameson

(10) Patent No.: US 8,281,912 B2
(45) Date of Patent: Oct. 9, 2012

(54) STAMPABLE THRUST WASHER WITH FLOW CUTOUTS

(75) Inventor: Jonathan Jameson, Dalton, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 403 days.

(21) Appl. No.: 12/381,454

(22) Filed: Mar. 12, 2009

(65) Prior Publication Data

US 2009/0238505 A1    Sep. 24, 2009

Related U.S. Application Data

(60) Provisional application No. 61/069,893, filed on Mar. 18, 2008.

(51) Int. Cl.
*F16C 17/04* (2006.01)
*F16C 32/06* (2006.01)
*F16D 33/00* (2006.01)

(52) U.S. Cl. ........................ 192/3.29; 384/420

(58) Field of Classification Search .......... 192/3.28–3.3, 192/110 B, 113.5; 384/368, 420
See application file for complete search history.

(56) References Cited

U.S. PATENT DOCUMENTS

| | | | | |
|---|---|---|---|---|
| 1,660,433 A | * | 2/1928 | Christman | 384/368 |
| 2,792,789 A | * | 5/1957 | Mizen | 384/368 |
| 2,871,069 A | | 1/1959 | Weber | |
| 2,872,256 A | * | 2/1959 | Thomson | 384/420 |
| 4,795,220 A | * | 1/1989 | Mori | 384/368 |
| 4,850,819 A | * | 7/1989 | Bush et al. | |
| 5,035,519 A | * | 7/1991 | Aizawa et al. | 384/368 |
| 5,602,945 A | * | 2/1997 | Davis | 384/368 |
| 5,676,230 A | * | 10/1997 | Awaji et al. | 192/110 B |
| 6,006,886 A | * | 12/1999 | Sasse et al. | 192/113.5 |
| 6,464,054 B2 | * | 10/2002 | Fukunaga et al. | 192/3.29 |
| 6,511,226 B2 | * | 1/2003 | Thompson et al. | 384/420 |
| 6,640,945 B2 | * | 11/2003 | Arhab et al. | 192/3.29 |
| 6,789,992 B2 | * | 9/2004 | Horng et al. | 384/420 |
| 6,814,203 B2 | * | 11/2004 | Kamiya et al. | 192/110 B |
| 6,918,701 B2 | * | 7/2005 | Ueno et al. | 384/420 |
| 2004/0076522 A1 | * | 4/2004 | Ochi et al. | |
| 2004/0251104 A1 | * | 12/2004 | Abe et al. | 192/3.29 |
| 2007/0137977 A1 | * | 6/2007 | Peri et al. | 192/110 B |
| 2007/0144162 A1 | * | 6/2007 | Ochi et al. | |

FOREIGN PATENT DOCUMENTS

| | | | | |
|---|---|---|---|---|
| EP | 246424 | * | 11/1987 | 384/420 |
| JP | 62088817 | * | 4/1987 | 384/420 |
| JP | 04300447 | * | 10/1992 | 192/3.29 |

* cited by examiner

*Primary Examiner* — Gregory Binda
*Assistant Examiner* — Josh Skroupa
(74) *Attorney, Agent, or Firm* — Simpson & Simpson, PLLC (57) ABSTRACT

A stampable thrust washer for a torque converter including an inner circumference, an outer circumference, and a plurality of cutouts disposed in the thrust washer, wherein the cutouts are in fluid communication with the inner and outer circumferences when said thrust washer is engaged between two rotationally engaged components.

8 Claims, 6 Drawing Sheets

PRIOR ART

STAMPABLE THRUST WASHER WITH FLOW CUTOUTS

CROSS REFERENCE TO RELATED APPLICATIONS

This patent application claims the benefit under 35 U.S.C.§119(e) of U.S. Provisional Application No. 61/069,893, filed Mar. 18, 2008, which application is incorporated herein by reference.

FIELD OF THE INVENTION

This invention generally relates to thrust washers, more specifically to thrust washers for torque converters, and even more specifically to thrust washers for torque converters which can be manufactured by a stamping process.

BACKGROUND OF THE INVENTION

Figure 1A:
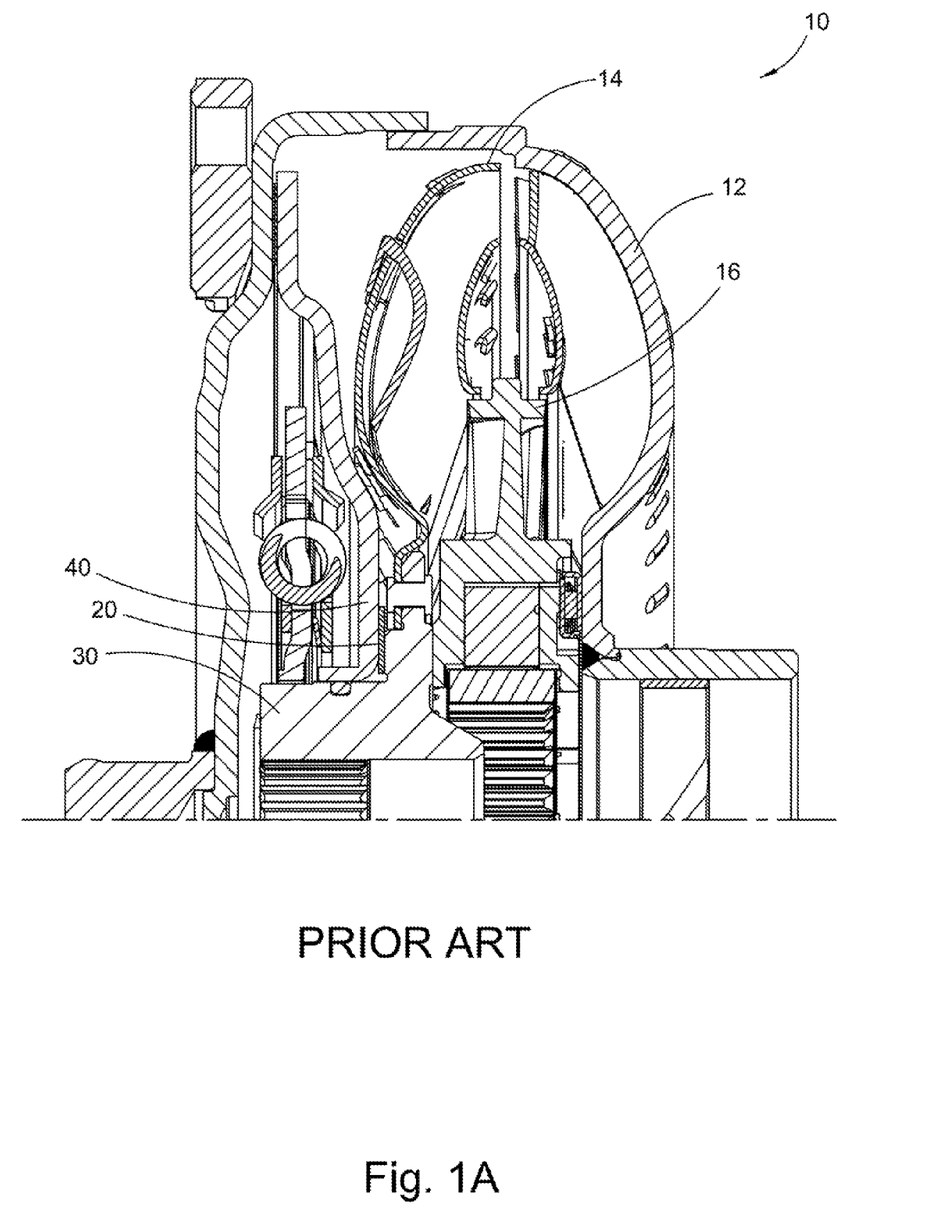
FIG. 1A is a cross-sectional view of a top half of a prior art torque converter.

FIG. 1A is a cross-sectional view of prior art torque converter 10. It should be appreciated that only the top half of the torque converter is shown in FIG. 1A, since the bottom half is substantially a mirror image of the top half. Likewise, only an upper portion of thrust washer 20 is shown. Torque converter 10 is a typical torque converter including pump 12, turbine 14, and stator 16. Torque converter 10 includes prior art thrust washer 20 engaged between turbine hub 30 and piston 40. The thrust washer is essentially a thin, flat disk with the center removed. Thrust washers are necessary in many torque converters to prevent wear at the point of contact between two components which move relative to each other. Thrust washers are similar to bearings, except thrust washers use fluid lubrication instead of balls or rollers to allow for a smooth rotational motion of two components in contact.

Specifically, during operation of torque converter 10, thrust is generated on turbine hub 30, causing the hub to contact piston 40. To prevent excessive wear between hub 30 and piston 40, a thrust washer, for example, thrust washer 20, is disposed between the hub and the piston.

Figure 1B:
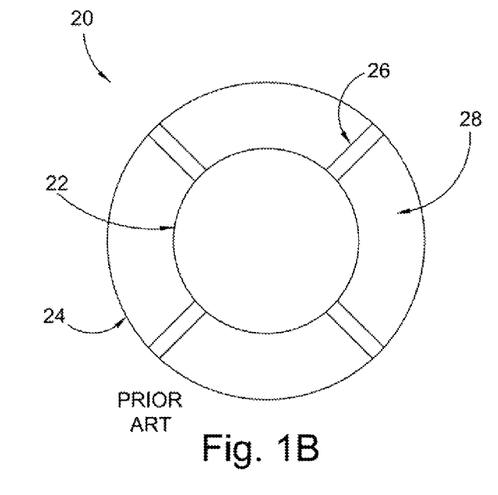
FIG. 1B is a front view of a prior art thrust washer.
Figure 1C:
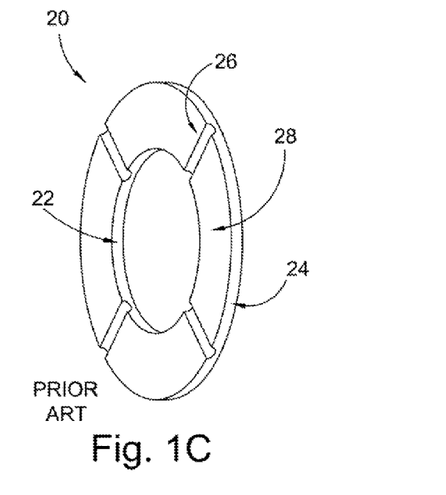
FIG. 1C is a perspective view of the prior art washer shown in FIG. 1B.

The following refers to FIGS. 1B, and 1C which show a front and perspective view, respectively, of prior art thrust washer 20. In order to properly operate, fluid circuits must be provided in the torque converter for cooling fluids, such as oil. An adequate flow of fluid is necessary to change and maintain fluid pressures in the torque converter, particularly for adequate clutch capacity and clutch controllability. Furthermore, thrust bearings must be able to provide a sufficient layer of lubrication to reduce the wear and friction between moving parts. Since the thrust washer blocks some of the necessary fluid circuits, provision must be made to allow fluid to pass between the inner and outer circumferences 22 and 24, respectively, of washer 20. Traditionally, to accomplish this fluid communication between the inner and outer circumferences, it is known to provide grooves 26 in face 28 of washer 20. For purposes of the description herein, the terms inner and outer circumferences may refer the entire surface defined by the inner or outer circumferences, in addition to just the edges.

Thrust washers are commonly made out of polymers, or plastics, since it is easy to mold grooves into a plastic thrust washer. Unfortunately, plastic thrust washers are quite expensive to produce. Therefore, steel thrust washers are sometimes used, since steel washers are cheaper than their plastic counterparts. However, grooves can not be simply stamped into the steel washers, because this would create protrusions on the face of the washer opposite face from each groove. Such protrusions are not acceptable, because they would detract from the performance of the washers. Therefore, each groove must be machined into the face of steel thrust washers, greatly increasing the cost and time required to make each thrust washer.

Thus, there is a long-felt need for thrust washers which provide the same fluid flow communication as prior art washers, but which can be more cheaply manufactured.

BRIEF SUMMARY OF THE INVENTION

The present invention broadly comprises a thrust washer for a torque converter including an inner circumference, an outer circumference, and a plurality of cutouts disposed in the thrust washer, wherein the cutouts are operatively arranged to enable fluid communication between the inner and outer circumferences.

In one embodiment each of the cutouts in the plurality extend radially from the inner circumference towards the outer circumference, and each of the cutouts comes substantially close to, but does not connect to the outer circumference. In another embodiment each of the cutouts in the plurality extend radially from the outer circumference towards the inner circumference, and each of the cutouts comes substantially close to, but does not connect to the inner circumference. In yet another embodiment each radially disposed cutout in the plurality is located between the inner and outer circumferences, but does not connect to either the outer circumference or the inner circumference.

In yet another embodiment, the plurality of cutouts is arranged in at least one oppositely disposed pair of cutouts. In another embodiment the thrust washer is manufactured by a stamping process. In yet another embodiment the cutouts are equally spaced from each other about the thrust washer.

Alternatively described, in one embodiment, the present invention thrust washer includes an annular portion and a plurality of openings in the annular portion. In a further embodiment, the thrust washer includes an inner circumference, wherein at least one opening in the plurality of openings is in communication with the inner circumference. In yet another embodiment, the thrust washer includes an outer circumference, wherein at least one opening in the plurality of openings is in communication with the outer circumference. In yet another embodiment, at least one opening in the plurality of openings is enclosed by the annular portion.

It is a general object of the present invention to provide a thrust washer for a torque converter which includes cutouts for enabling sufficient fluid flow to maintain necessary fluid circuits in the torque converter.

It is another object of the present invention to provide a thrust washer with the above capability which can be manufactured from steel in a stamping or coining process.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it should be understood that this invention is not limited to the particular methodology, materials and modifications described and as such may, of course, vary. It should also be understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 6A:
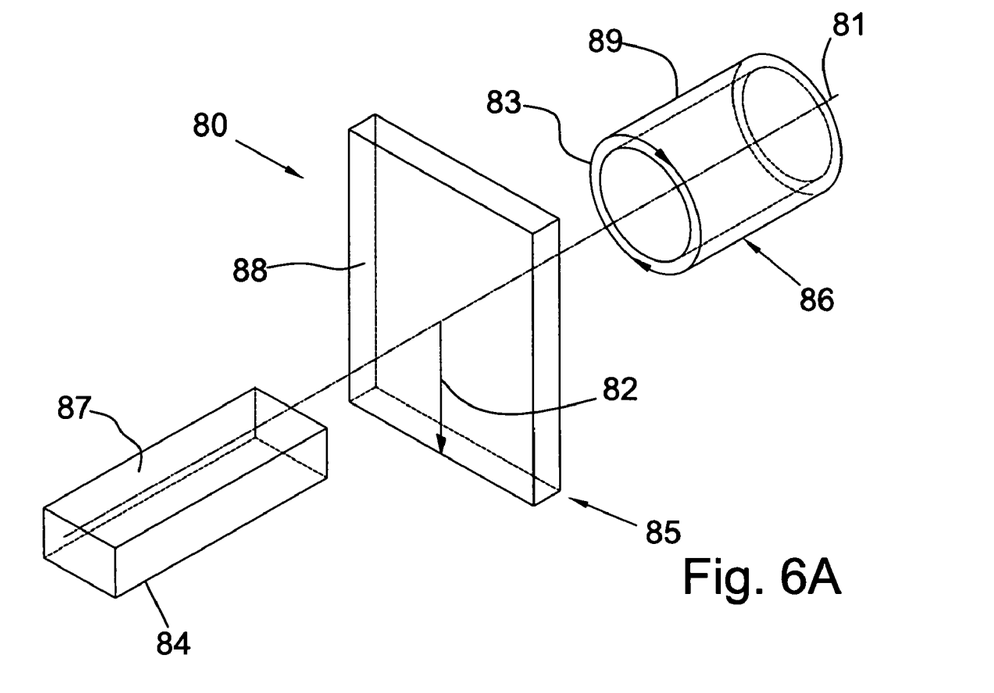
FIG. 6A is a perspective view of a cylindrical coordinate system demonstrating spatial terminology used in the present application; and, FIG. 6B is a perspective view of an object in the cylindrical coordinate system of FIG. 6A demonstrating spatial terminology used in the present application.

FIG. 6A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 6B:
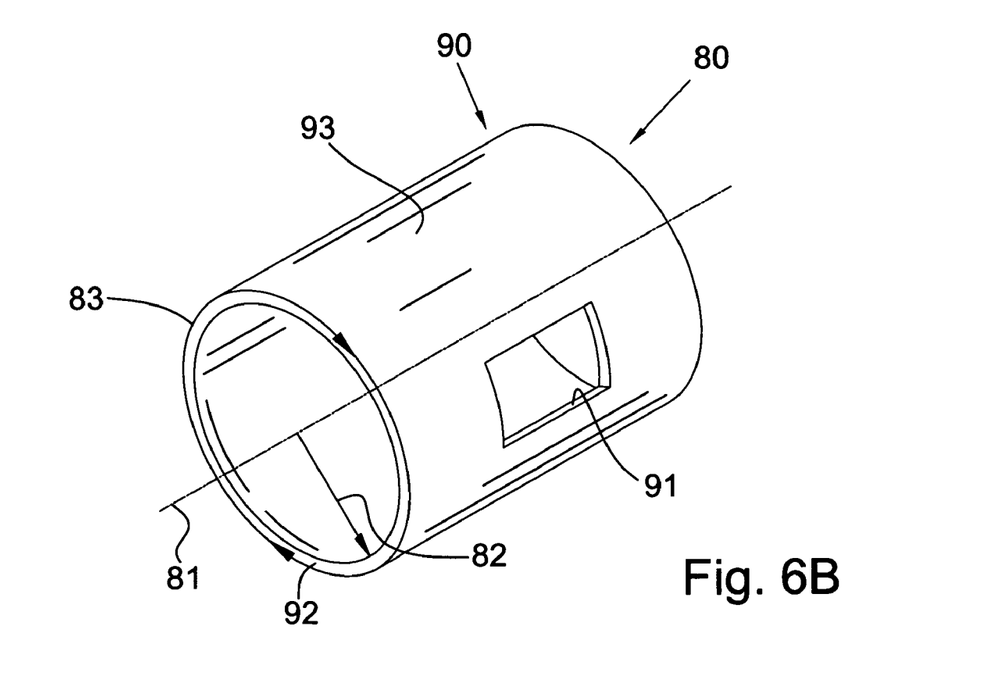

FIG. 6B is a perspective view of object 90 in cylindrical coordinate system 80 of FIG. 6A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2A:
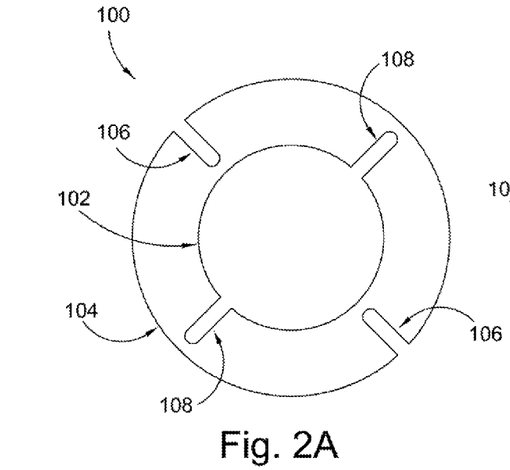
FIG. 2A is a front view of a present invention thrust washer.
Figure 2B:
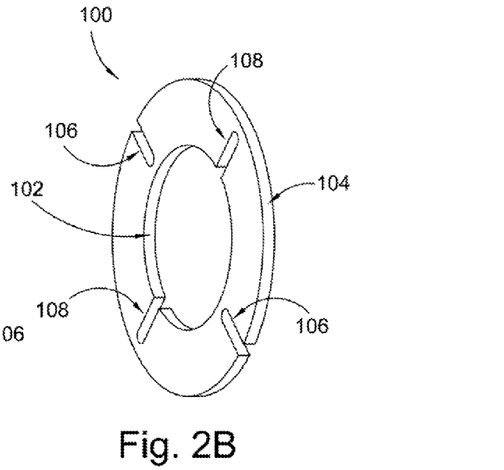
FIG. 2B is a perspective view of the thrust washer shown in FIG. 2A.

FIG. 2A is a front view of present invention thrust washer 100. FIG. 2B is a perspective view of thrust washer 100 shown in FIG. 2A.

The following should be viewed in light of FIGS. 2A and 2B. Thrust washer 100 includes inner circumference 102 and outer circumference 104. Thrust washer 100 is arranged to provide fluid communication between the inner and outer circumferences. By this we mean that fluid is allowed to flow through the washer so that fluid can travel between an area generally radially beyond the outer circumference and an area proximate to the inner circumference. Alternatively stated, the washer does not block necessary fluid circuits in the torque converter, for example, fluid circuits necessary to operate a converter by-pass clutch (not shown). In addition to enabling the necessary fluid circuits, the cutouts also enable the fluid to flow between the thrust washer and components with which the thrust washer is in contact, for example, piston 110, to create a hydrodynamic layer, which is essential to the functionality of the thrust washer and the components.

To provide fluid communication, thrust washer 100 includes cutouts 106 and 108. In a preferred embodiment, cutouts 106 originate at outer circumference 104 and extend radially inward towards inner circumference 102, but do not fully extend to circumference 102. Alternately stated, the cutouts open to outer circumference 104 and extend part way to the inner circumference. There is a small portion of material between each cutout 106 and the inner circumference. Likewise, cutouts 108 originate at inner circumference 102 and extend radially outward towards outer circumference 104, but do not fully extend to circumference 104. Alternately stated, the cutouts open to the inner circumference and extend part way to the outer circumference. There is a small portion of material between each cutout 108 and the outer circumference.

Figure 3A:
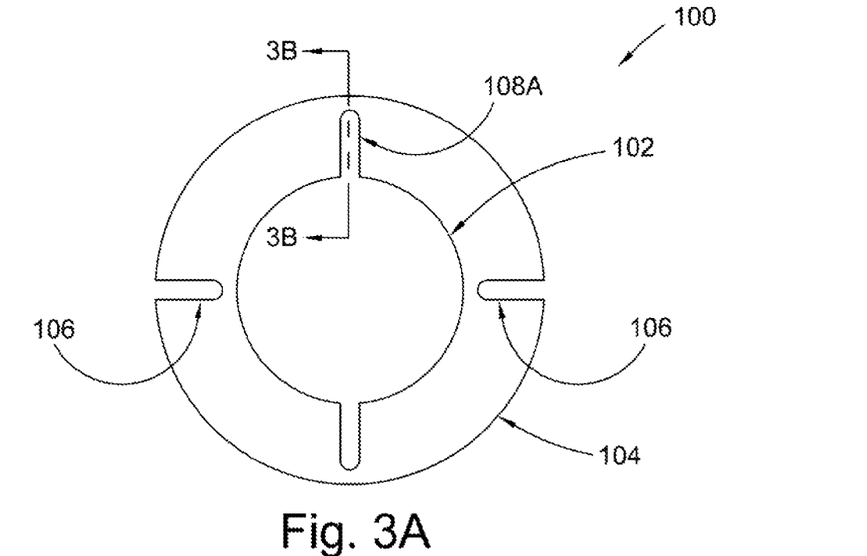
FIG. 3A is a front view of a present invention thrust washer.
Figure 3B:
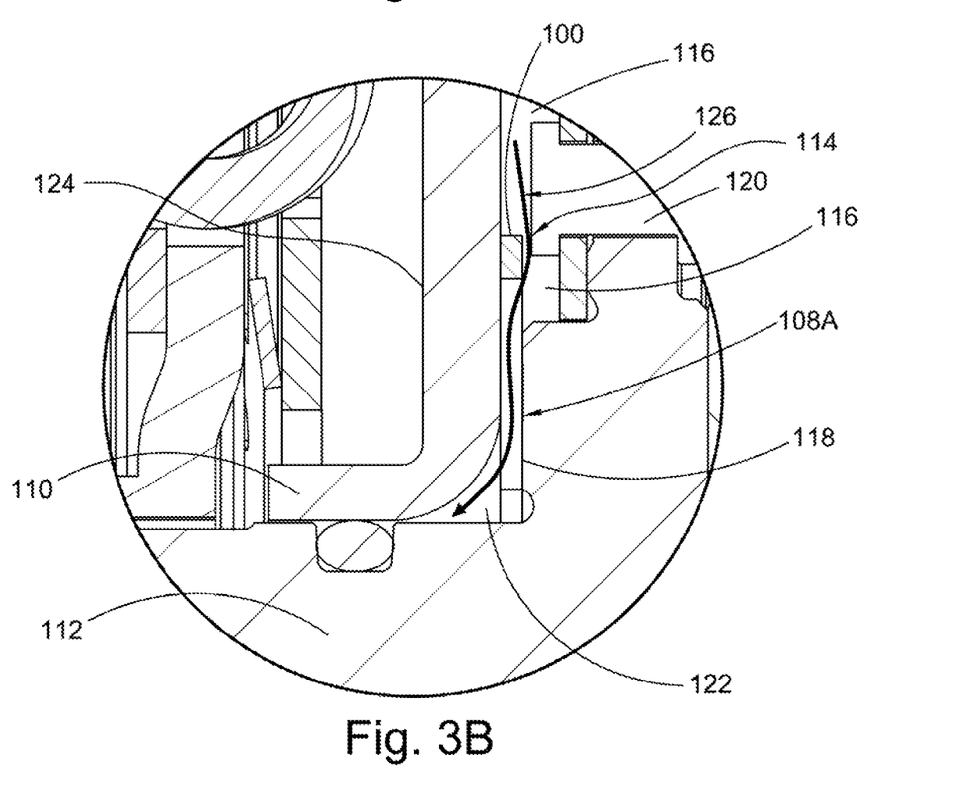
FIG. 3B is an enlarged cross-sectional view of a piston and hub in a torque converter, and the portion of the thrust washer generally along line 3B-3B in FIG. 3A.

FIG. 3B is an enlarged cross-sectional view of a piston and hub in a torque converter, and the portion of the thrust washer generally along line 3B-3B in FIG. 3A. FIG. 3B shows thrust washer 100 installed between hub 112 and piston 110 in a torque converter (only partially shown). It should be appreciated that hub 112 and piston 110 are similar to hub 30 and piston 40 in torque converter 10. Gap 114 in chamber 116 is formed between the thrust washer and one or more components proximate axial side 118 of the thrust washer, for example, rivet 120. Cutout 108A is in fluid communication with chamber 116 and chamber 122 on radial side 124 of the thrust washer. That is, the cutout provides fluid communication between the chambers as shown by flow path 126. For example, fluid exchange between the chambers through the thrust washer can enable operation of the by-pass clutch noted above and the fluid exchange can provide lubricating fluid for side 124 and the piston. It should be clear that chamber 116 is generally radially beyond outer circumference 104, and that chamber 122 is generally proximate to inner circumference 102. Therefore, cutout 108A in the shown embodiment provides fluid communication between the outer and inner circumferences.

It should be understood that the direction of flow shown in FIG. 3B can be reversed, that is, fluid can flow from chamber 122 to chamber 116 through the cutouts.

Figure 4A:
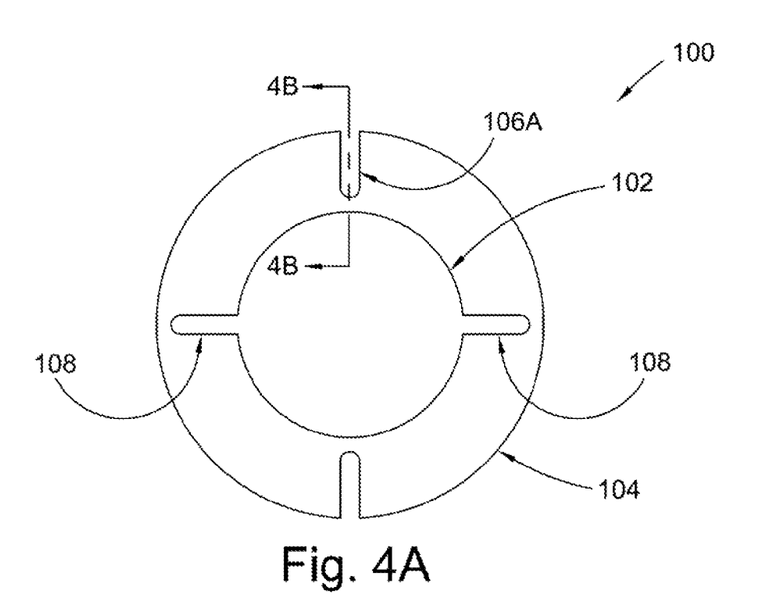
FIG. 4A is a front view of the thrust washer of FIG. 3A rotated 90 degrees.

FIG. 4A is a front view of thrust washer 100 shown in FIG. 3A, rotated 90 degrees.

Figure 4B:
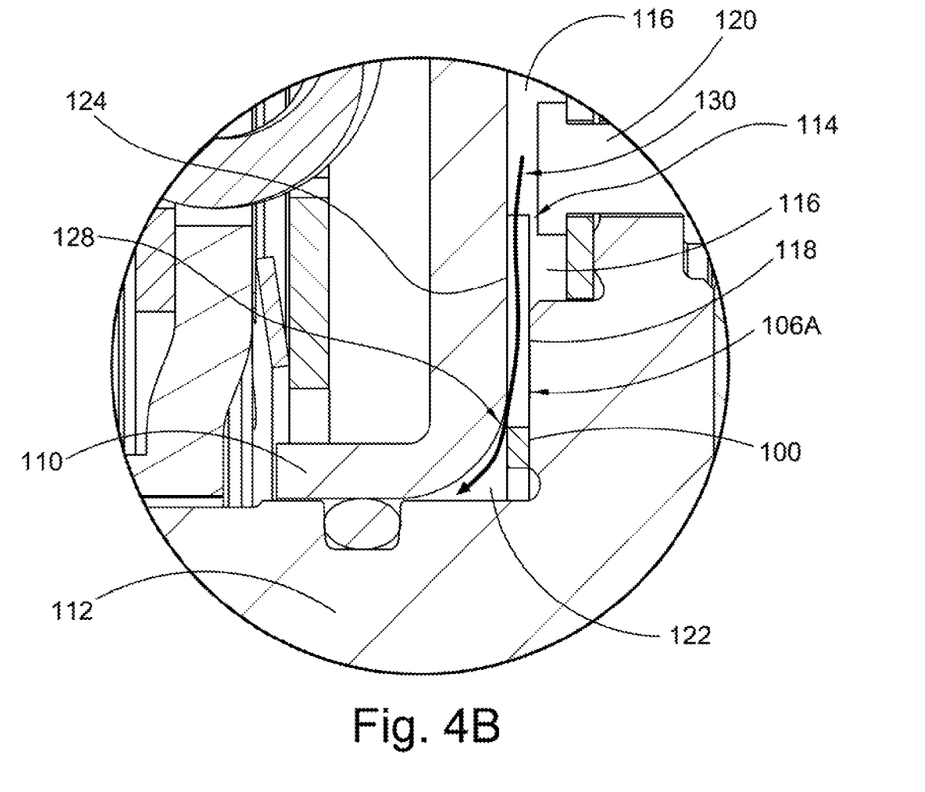
FIG. 4B is an enlarged cross-sectional view of a piston and hub in a torque converter, and the portion thrust washer generally along line 4B-4B in FIG. 4A.

FIG. 4B is an enlarged cross-sectional view of the portion of the torque converter shown in FIG. 3B showing thrust washer 100 shown in FIG. 4A and piston 110 and hub 112, the portion of the thrust washer generally along line 4B-4B in FIG. 4A. The following should be viewed in light of FIGS. 4A and 4B. Chamber 116 is in fluid communication with cutout 106A partly through the opening of the cutout at the outer circumference and partly through the opening in radial side 118. Gap 128, between the cutout and chamber 122, is formed between the washer and the piston. Thus, cutout 106A is in fluid communication with chamber 120 and chamber 122. That is, the cutout provides fluid communication between the chambers as shown by flow path 130. For example, fluid exchange between the chambers through the thrust washer can enable operation of the by-pass clutch noted above and the fluid exchange can provide lubricating fluid for side 124 and the piston. Therefore, cutout 106A in the shown embodiment provides fluid communication between the outer and inner circumferences.

It should be understood that the direction of flow shown in FIG. 4B can be reversed, that is, fluid can flow from chamber 122 to chamber 116 through the cutouts.

Figure 5A:
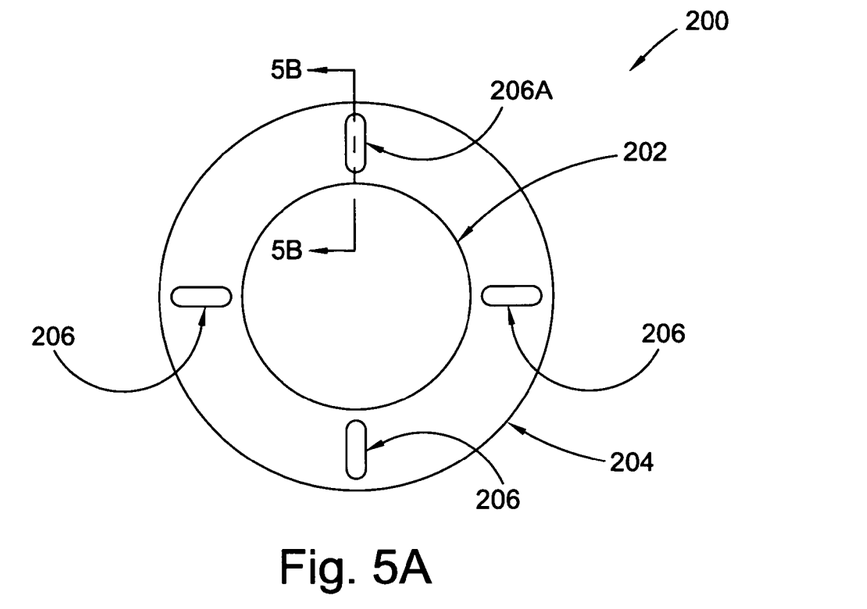
FIG. 5A is a front view of a second embodiment for the current invention thrust washer.

FIG. 5A is a front view of present invention thrust washer 200.

Figure 5B:
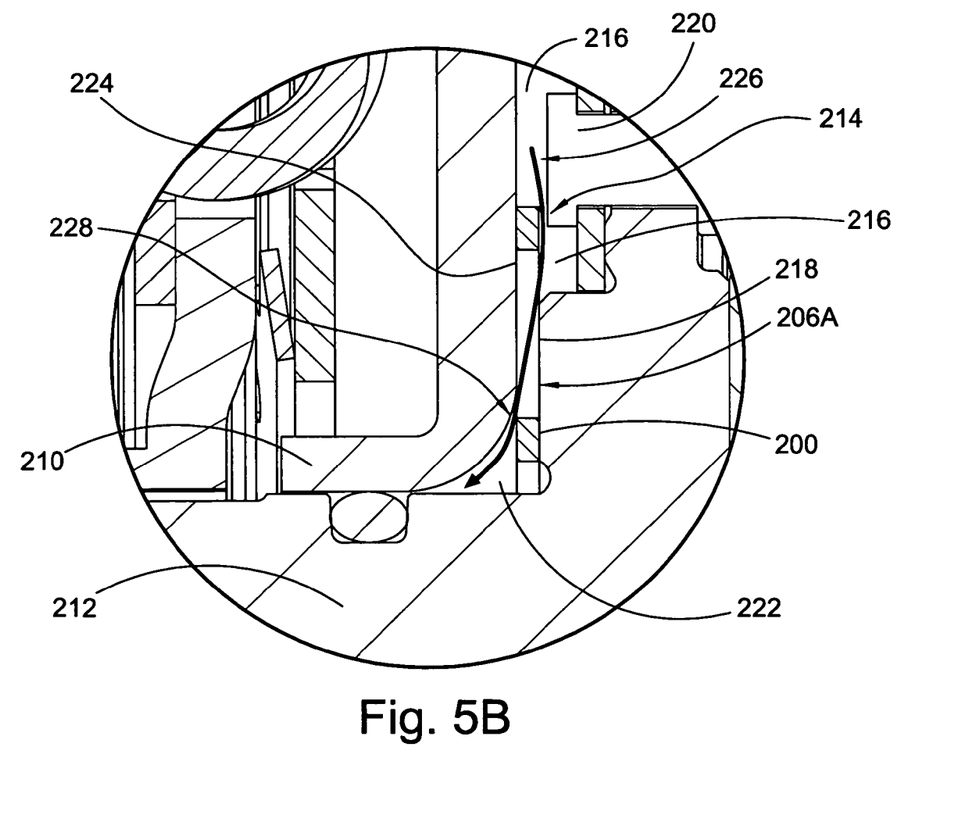
FIG. 5B is an enlarged cross-sectional view of a piston and hub in a torque converter, and the portion of the thrust washer generally along line 5B-5B in FIG. 5A.

FIG. 5B is an enlarged cross-sectional view of a portion of a torque converter showing thrust washer 200 shown in FIG. 5A and a piston and hub, the portion of the thrust washer generally along line 5B-5B in FIG. 5A. The following should be viewed in light of FIGS. 5A and 5B. Thrust washer 200 includes inner circumference 202 and outer circumference 204. Thrust washer 200 is arranged to provide fluid communication between the inner and outer circumferences. By this we mean that fluid is allowed to flow through the washer so that fluid can travel between an area generally radially beyond the outer circumference and an area proximate to the inner circumference. Alternatively stated, the washer does not block necessary fluid circuits in the torque converter, for example, fluid circuits necessary to operate a converter by-pass clutch (not shown). In addition to enabling the necessary fluid circuits, the cutouts also enable the fluid to flow between the thrust washer and components with which the thrust washer is in contact, for example, piston 210 to create a hydrodynamic layer, which is essential to the functionality of the thrust washer and the components.

To provide fluid communication, thrust washer 200 includes cutouts 206. In a preferred embodiment, cutouts 206 are fully enclosed by the washer. That is, the cutouts do not open to either the inner of the outer circumference. There is a portion of material between each cutout 206 and the inner and outer circumferences.

FIG. 5B shows thrust washer 200 installed between hub 212 and piston 210 in a torque converter (only partially shown). Gap 214 in chamber 216 is formed between the thrust washer and one or more components proximate axial side 218 of the thrust washer, for example, rivet 220. Cutout 206A is in fluid communication with chamber 216 on radial side 218 of the thrust washer. Gap 228 in chamber 222 is formed between the thrust washer and one or more components proximate axial side 224 of the thrust washer, for example, the piston. Cutout 206A is in fluid communication with chamber 222. Therefore, the cutout provides fluid communication between the chambers as shown by flow path 226. For example, fluid exchange between the chambers through the thrust washer can enable operation of the by-pass clutch noted above and the fluid exchange can provide lubricating fluid for side 224 and the piston.

It should be understood that the direction of flow shown in FIG. 5B can be reversed, that is, fluid can flow from chamber 222 to chamber 216 through the cutouts.

It should be appreciated that in the shown embodiments of FIGS. 2A-4B, there are two cutouts 106 arranged in an oppositely disposed pair, and two cutouts 108, which are also arranged in an oppositely disposed pair, with the pair of cutouts 108 evenly spaced between the pair of cutouts 106. By oppositely disposed we mean that they are 180 degrees apart. In another embodiment, however, there may be more or less cutouts than in the shown embodiment.

The following refers again to the second embodiment of the current invention thrust washer shown in FIGS. 5A and 5B. In a preferred second embodiment, thrust washer 200 includes four cutouts 206 instead of cutouts 106 and 108. As shown in FIG. 5B, the flow of fluid is able to pass by the washer and communicate between the inner and outer circumferences. Thrust washer 200 may be preferable over thrust washer 100 since the cutouts do not connect to either the inner or outer circumferences, and therefore, thrust washer 200 has more material, and therefore should be more durable. However, in some embodiments, thrust washer 100 may be preferable because the extra material present in thrust washer 200 may slightly restrict the flow of fluid past the washer. Regardless, both embodiments of current invention washer share the advantage of being able to be manufactured by a low cost stamping process.

Similar to the first embodiment of thrust washer, it should appreciated that thrust washer 200 may have more or less than the four cutouts, shown in the preferred embodiments. Furthermore, the cutouts may be shaped and sized differently, as long as the cutouts can provide sufficient fluid flow communication between the outer and inner circumferences. In either embodiment, the cutouts may be coined, or stamped, such that the edges are chamfered. A chamfered edge around the cutout may enhance the ability of the fluid to flow into and out of the cutouts to provide for between fluid flow communication. It also should be understood that any combination of cutouts opening to the inner circumference, opening to the outer circumference, or fully enclosed are possible in a present invention thrust washer.

Advantageously, the current invention washer can be fabricated from steel by a relatively simple stamping operation. Unlike grooves 26 in prior art washer 20, the cutouts in the current invention washer are cut through the entire thickness of the washer, and therefore do not need to be machined. Thus, the current invention washers enable substantial savings in costs and manufacturing time with respect to the prior art washers, which must be machined steel or expensive polymers.

Lastly, it should be appreciated that the current invention thrust washer can be used in any torque converter known in the art that includes a piston and hub, or two similarly situated components, which are in rotational contact.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A thrust washer for a torque converter comprising:
   first and second surfaces, orthogonal to an axis of rotation for the thrust washer, facing in opposite axial directions;
   an inner circumference connecting the first and second surfaces;
   an outer circumference connecting the first and second surfaces;
   a uniform axial thickness, in a direction parallel to the axis of rotation, between the inner and outer circumferences; and,
   first and second pluralities of cutouts disposed in said thrust washer and passing through the thrust washer, wherein:
      a circular line, at a uniform distance from the inner circumference, passes through the first and second pluralities of cutouts;
      the first plurality of cutouts is open to the inner circumference; and,
      the second plurality of cutouts is open to the outer circumference.

2. The thrust washer recited in claim 1 wherein said first and second pluralities of cutouts are arranged in at least one respective oppositely disposed pair of cutouts.

3. The thrust washer recited in claim 1 which is manufactured by a stamping process.

4. The thrust washer recited in claim 1 wherein respective cutouts in said first and second pluralities of cutouts are equally spaced from each other about said thrust washer.

5. The thrust washer recited in claim 1 wherein said first plurality of cutouts is spaced ninety degrees from said second plurality of cutouts.

6. A torque converter comprising:
   a piston;
   a hub; and,
   a thrust washer including:
      first and second surfaces, orthogonal to an axis of rotation for the thrust washer, facing in opposite axial directions;
      a uniform axial thickness, in a direction parallel to the axis of rotation, between the inner and outer circumferences;
      an inner circumference connecting the first and second surfaces;
      an outer circumference connecting the first and second surfaces; and,
      first and second pluralities of cutouts disposed in said thrust washer and passing through the thrust washer, wherein:
         a circular line, at a uniform distance from the inner circumference, passes through the first and second pluralities of cutouts;
         the first plurality of cutouts is open to the inner circumference; and,
         the second plurality of cutouts is open to the outer circumference.

7. The torque converter recited in claim 6 wherein said thrust washer is engaged between said piston and said turbine hub.

8. A torque converter comprising:
   a piston;
   a hub; and,
   a thrust bearing with:
      an inner circumference;
      an outer circumference; and,
      first and second pluralities of cutouts passing through the inner circumference and the outer circumference of the thrust washer, respectively;
      a first chamber at least partially formed by the outer circumference and a first portion of the piston; and,
      a second chamber at least partially formed by the hub and a second portion of the piston radially inward of the first portion, wherein:
         said first and second chambers are in fluid communication through said second plurality of cutouts;
         the first plurality of cutouts opens to the inner circumference; and,
         the second plurality of cutouts opens to the outer circumference.

* * * * *